United States Patent

Egan

[15] 3,662,972
[45] May 16, 1972

[54] MAGAZINE FOR A REEL OF FILM OR THE LIKE

[72] Inventor: John F. Egan, Rochester, N.Y.

[73] Assignee: Eastman Kodak Company, Rochester, N.Y.

[22] Filed: May 8, 1970

[21] Appl. No.: 35,803

[52] U.S. Cl............................................242/197, 352/78
[51] Int. Cl.................G03b 1/04, G11b 15/32, G11b 23/04
[58] Field of Search....................242/71.1, 71.2, 197–200, 242/134–138; 352/72–78

[56] References Cited

UNITED STATES PATENTS

| | | | |
|---|---|---|---|
| 1,685,010 | 9/1928 | Thornton | 242/71.1 |
| 3,454,961 | 7/1969 | Tatter | 242/197 |
| 3,037,719 | 6/1962 | Bemmann | 242/71.1 |
| 3,493,188 | 2/1970 | Krtous | 242/71.1 |

Primary Examiner—Leonard D. Christian
Attorney—John D. Husser and Robert W. Hampton

[57] ABSTRACT

A cartridge for a reeled strip of web material is inserted into a container to form therewith a light-tight magazine. The cartridge includes a flexible boss for removably retaining a web reel within the cartridge interior, a projection cooperable with the container to restrain such a retained web reel against movement, a strip engaging finger and barb for disposing the free end of the reeled strip in a position for contact for an automatic strip feeding mechanism of apparatus into which the cartridge is insertable for utilization of the strip material, and abutment edges and notches which prevent improper insertion of the cartridge into the apparatus.

11 Claims, 7 Drawing Figures

Patented May 16, 1972

JOHN F. EGAN
INVENTOR.

BY John D. Husse
Robert W. Hampton
ATTORNEYS

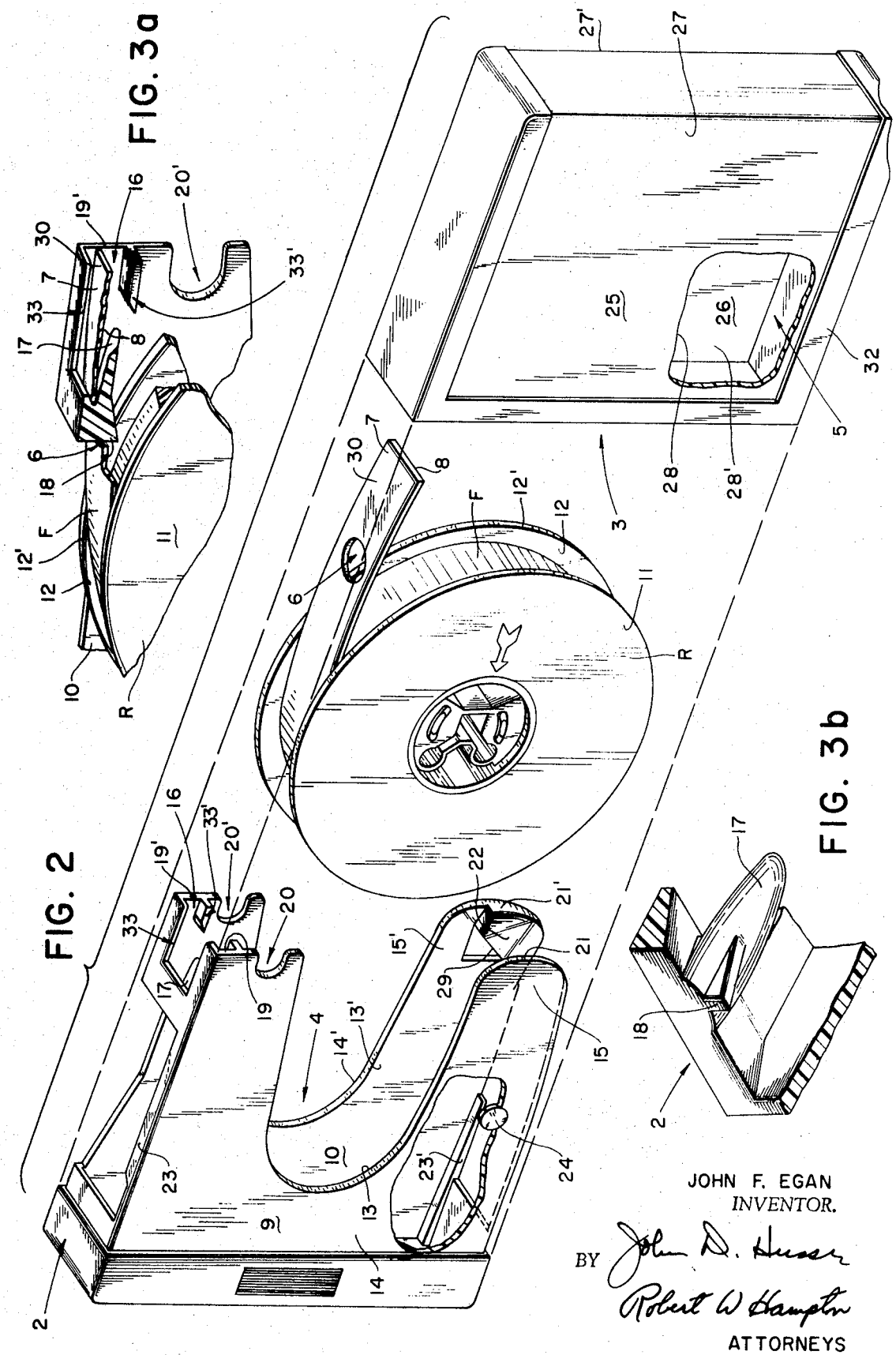

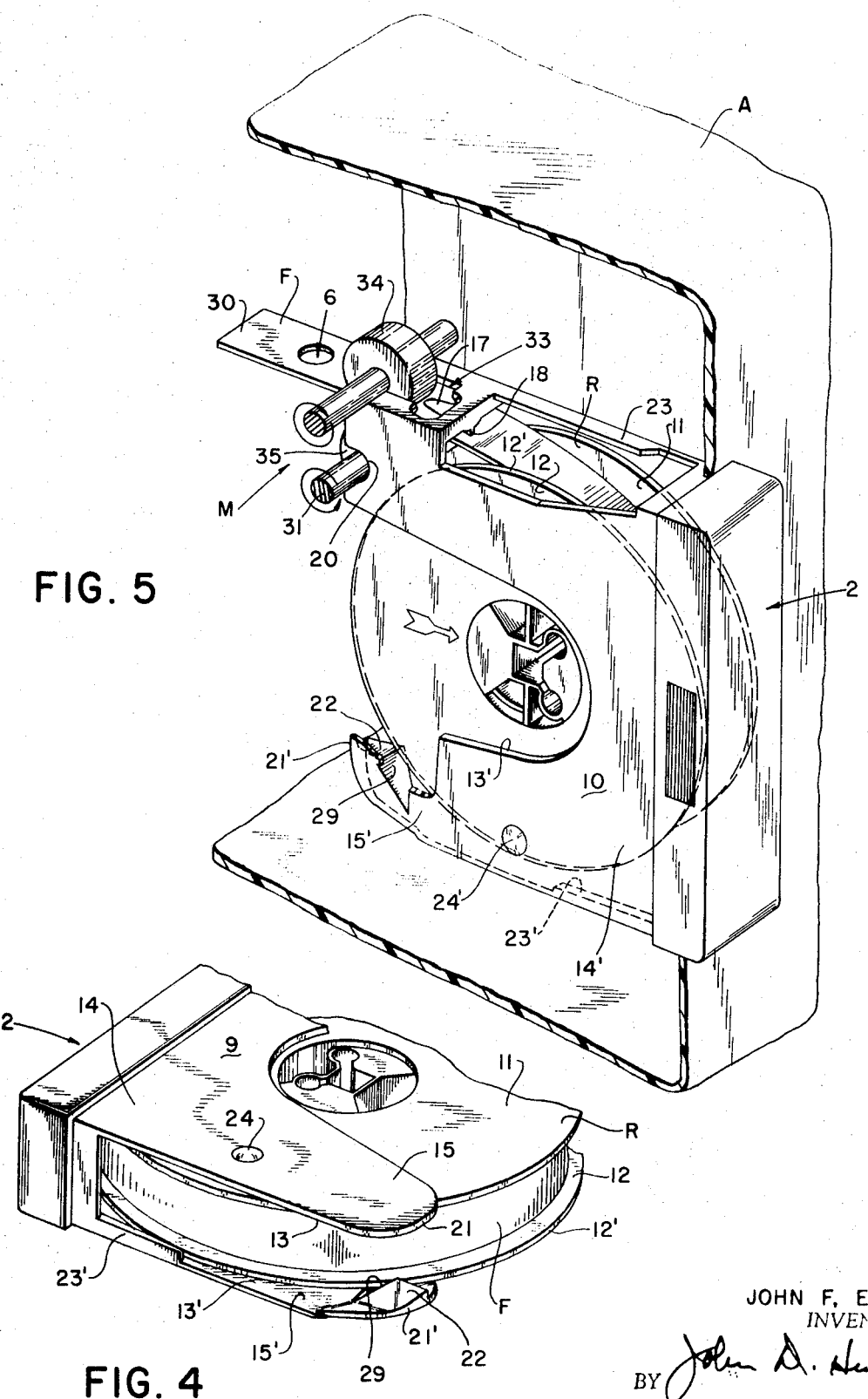

3,662,972

MAGAZINE FOR A REEL OF FILM OR THE LIKE

CROSS REFERENCE TO RELATED APPLICATION

Reference is made to commonly assigned copending U.S. Pat. application Ser. No. 35,802, entitled MEANS FOR SECURING AND RELEASING STRIP END PORTIONS, filed in the name of John F. Egan on May 8, 1970 now U.S. Pat. No. 3,613,977.

BACKGROUND OF THE INVENTION

1. Field of the Invention

The present invention relates to a new and improved magazine for a strip of reeled material, and more particularly to a cassette, i.e. a light-tight magazine, that includes a removable film reel cartridge adapted for insertion into the supply or take-up areas of the type of photographic apparatus having an automatic film feeding mechanism.

2. Description of the Prior Art

In present magazines for reeled strip materials, the strip material used often comprises a plastic-like substance having a tendency to curl. If a plastic strip is wound on the reel in a magazine, its curling propensity may cause the free, i.e. leading, end of such a strip to shift out of alignment with the strip egress opening in the magazine so as to obstruct feeding of the free strip end through the opening. An additional problem arises if the reel in a magazine is not restrained against inadvertent rotation as a strip wound thereon may spill off the unrestrained reel and become entangled within the magazine interior.

There are known magazines wherein a spring member is used to releasably engage the free end of a reeled strip inwardly of the magazine's strip egress opening in order to hold the free strip end adjacent such opening. Also, it is known for a magazine to make use of a spring member that is normally biased to lock the magazine reel against inadvertent rotation. Characteristically, such spring members are moved to free the reel for rotation and/or release an engaged strip to permit movement of its free end through the strip egress opening, only on insertion of the magazine into apparatus designed to utilize the strip material. However, the continual flexing of such spring members may weaken their effectiveness, and the introduction of a foreign spring member distinct from the composition of the magazine molding significantly increases both material and assembly costs. Furthermore, in order to use such magazines, a mechanism must be built into the apparatus utilizing the strip material to move the magazine's spring member to an inoperative position and to hold the magazine within the apparatus against the expelling or otherwise disturbing force of the spring.

SUMMARY OF THE INVENTION

It is therefore an object of the present invention to provide a new and improved magazine for reeled strip material.

Another object of the present invention is to provide a magazine that includes a web reel cartridge and a container therefor, and means integral to the cartridge for cooperating with the container to restrain a web reel against movement within the cartridge.

A further object of the present invention is to provide a web reel cartridge that has integral means for positively, i.e. affirmatively, maintaining the free end of a reeled strip in alignment with the cartridge's strip opening.

And yet another object of the present invention is to provide a cartridge that is designed to permit entry by a strip feeding mechanism and includes means cooperable with such mechanism to effect feeding of a strip material through the cartridge's strip opening.

These and other objects are accomplished in accordance with the present invention of a new and improved magazine for a reel of film or the like. In the disclosed embodiment of the invention, a cartridge for a filmstrip wound on a film reel is insertable into a container to form with the latter a light-tight magazine, i.e. a cassette, for the reeled filmstrip. The cartridge includes a flexibly movable boss for removably retaining a film reel inserted in the cartridge interior, means cooperable with the container to restrain such a retained film reel against movement within the cartridge interior, a filmstrip retaining finger and barb which dispose the free end of a reeled filmstrip in a position for ready engagement by the automatic film feeding mechanism of photographic apparatus into which the cartridge is insertable, and abutment and notch means which assure proper orientation of the cartridge in the photographic apparatus. The filmstrip retaining finger extends at an angle with respect to the opposed faces of the free end of a reeled filmstrip so as to prevent such free end from curling out of a film guide extending from within the cartridge interior to a filmstrip ingress and egress opening.

BRIEF DESCRIPTION OF THE DRAWING

The present invention and its objects and advantages will become more apparent in the detailed description of the preferred embodiment presented below when read in conjunction with the accompanying drawings, wherein:

FIG. 2 is a perspective view of a separated cartridge, container and reeled strip, illustrating the manner of cassette assembly;

FIG. 3A is an enlarged perspective sectional view of the strip retaining finger and barb depicted in FIG. 3;

FIG. 3B is an enlarged perspective view of the strip retaining finger and barb viewed from their underside;

FIG. 4 is a fragmentary perspective view of the cartridge and a reeled strip inserted therein, illustrating a flexible reel retaining boss; and FIG. 5 is a perspective view of the cartridge and a reeled strip retained therein, illustrating the manner of orientation of the cartridge in an apparatus for utilizing the strip material.

DESCRIPTION OF THE PREFERRED EMBODIMENT

Figure 1:
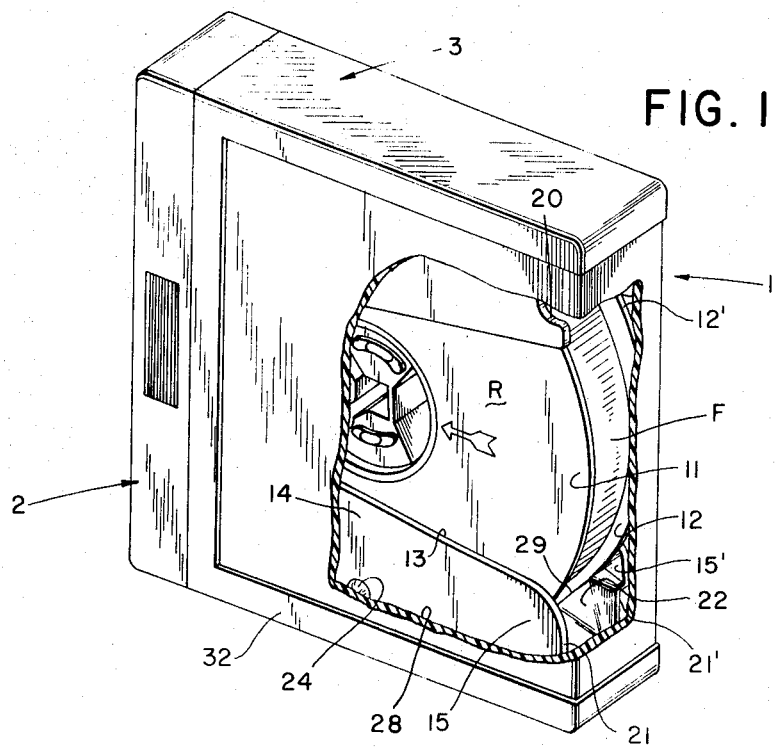
FIG. 1 is a perspective view of a cartridge and a container in accordance with the present invention, showing a portion of the container cut away to illustrate a projection formed on the cartridge and cooperating with the container to restrain a retained reel against movement.

Referring now to the drawings and in particular to FIGS. 1, 2 and 5, there is shown a cassette 1, i.e. a light-tight magazine, for a filmstrip F wound on a film reel R. The cassette comprises a cartridge 2 and a container 3. The cartridge has an open interior 4 which is shaped for supporting a removably inserted film reel and filmstrip. The container has an open interior 5 which is shaped for removably receiving the cartridge. Both the cartridge and the container are correspondingly constructed so that when the cartridge is received within the container there is formed a light-tight chamber for the storage of a reeled filmstrip. The cartridge is adapted to be inserted into a photographic apparatus A of the kind having a film feeding roller mechanism M. The filmstrip F is of the type having an aperture 6 which extends between the opposed filmstrip faces 7 and 8 and is located in each of the filmstrip ends 30. Although the magazine embodiment is described for use with film in photographic apparatus, it will be appreciated that features of the invention are applicable for use with analogous strip material of other types.

Figure 3:
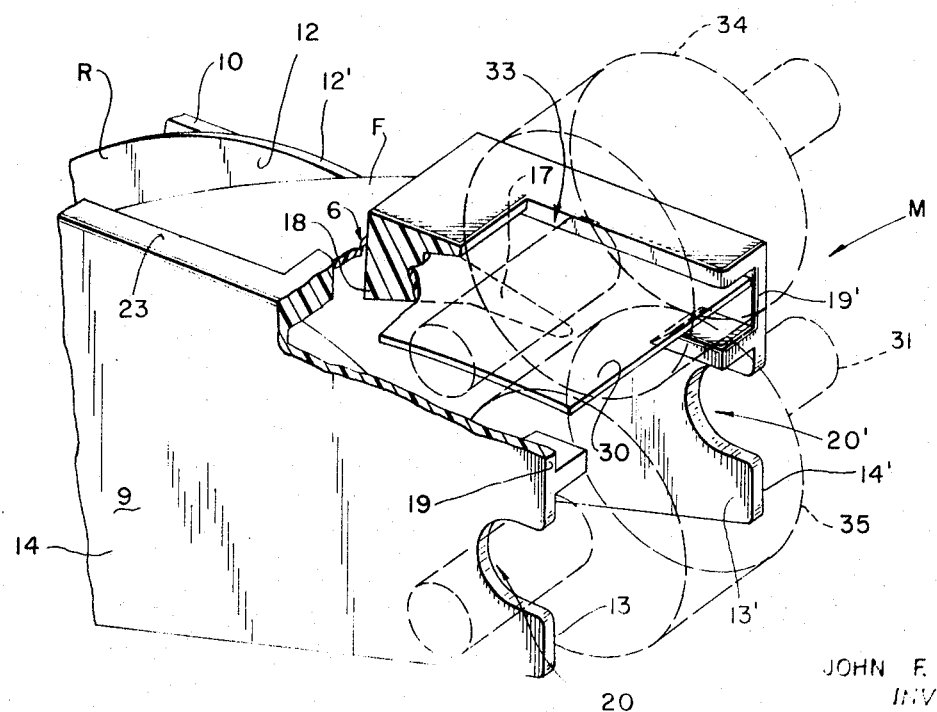
FIG. 3 is an enlarged fragmentary perspective view of the cartridge and a reeled strip inserted therein, illustrating the manner in which a pair of notches in the cartridge is used, and showing a portion of the cartridge cut away to illustrate the manner of use of a strip retaining finger and barb.

The cartridge 2 as illustrated in FIG. 2 has a pair of opposed wall members 9 and 10 that extend parallel to flanges 11 and 12 of a film reel R inserted in the cartridge's open interior 4 (FIG. 5). The opposed wall members are provided with respective interior member surfaces 13 and 13' and respective exterior member surfaces 14 and 14'. Portions of the opposed wall members 9 and 10 form respective arms 15 and 15'. The arms 15 and 15' are flexibly movable in directions substantially perpendicular to the flanges 11 and 12 of the inserted film reel, and can be moved towards each other in order to make intimate frictional contact with respective ones of such film reel flanges (FIG. 4). The cartridge 2 also has a filmstrip ingress and egress opening 16 which is formed by two opposed U-shaped filmstrip guides 19 and 19'. The guides are constructed to support a filmstrip F moving through the ingress and egress opening. With reference to FIGS. 3A and 3B, a filmstrip retaining finger 17 has one of its ends fixed to the cartridge and the other of its ends free and extending in the direction of the filmstrip ingress and egress opening. A filmstrip retaining barb 18 is formed on the fixed end of the filmstrip retaining finger. The cartridge 2 further includes notches 20 and 20' cut in its wall members 9 and 10 respectively, abutment edges 21 and 21' formed on the arms 15 and 15' respectively, a film reel retaining boss 22 formed on the arm 15', film reel retaining flanges 23 and 23' formed on the wall members 9 and 10 respectively, and projections 24 and 24' (FIGS. 4 and 5) formed on the arms 15 and 15' respectively.

The container 3 as shown in FIG. 2 has a pair of opposed wall elements 25 and 26. The opposed wall elements 25 and 26 are provided with respective exterior element surfaces 27 and 27' and respective interior element surfaces 28 and 28'. The exterior element surfaces 27 and 27' respectively form relieved areas which are framed on three sides by a raised container portion 32.

The cartridge structure and the container structure are each preferably formed as separate integrally molded bodies of plastic-like material. Since the particular film reel configuration and filmstrip thus far described and the method of molding the container and cartridge are well known in the art, further description is deemed unnecessary. It will of course be appreciated that other materials, such as for example sheet metal, can be used.

In the disclosed embodiment of the present invention, a filmstrip F wound on a film reel R can be inserted into the open interior 4 of the cartridge 2. Referring to FIGS. 2, 4 and 5, it can be seen that the cartridge is open on three sides. However, the cartridge flanges 23 and 23' and a lip portion 29 of the boss 22 will contact the edges of the flanges 11 and 12 of an inserted film reel so as to retain such film reel within the cartridge interior 4. The film reel retaining boss 22 is located on the interior member surface 13' of the flexibly movable arm 15'. Although the lip 29 normally engages a flange edge 12' of the inserted film reel, it is to be noted that the boss 22 is movable with the flexible arm 15' in a direction perpendicularly away from the flange 12 of such film reel in order to free the lip from such flange edge. Thus, it is apparent that the lip 29 is intended to retain and permit removal of a film reel supported in the cartridge interior, i.e. the arms 15 and 15' are flexed away from each other in order to either remove or insert the film reel with respect to the cartridge 2.

The two opposed U-shaped filmstrip guides 19 and 19', as viewed in FIGS. 2, 3, 3A and 5 are constructed to respectively support the two opposed filmstrip edges and guide the filmstrip F along a path extending from within the cartridge interior 4 to the filmstrip ingress and egress opening 16. The filmstrip retaining finger 17 (FIGS. 3 and 3A) engages the edge of the aperture 6 in the free, i.e. leading, end 30 of a filmstrip F wound on an inserted film reel R and disposes the free filmstrip end adjacent the filmstrip ingress and egress opening, thereby positioning the free filmstrip end for ready engagement by the film feeding roller mechanism M when the cartridge 2 is inserted into the supply area of the photographic apparatus A. As is clearly seen in FIGS. 3 and 3A, the portion of the cartridge that would join the two opposed filmstrip guides 19 and 19' is cut away to form two opposed access openings 33 and 33'. The access openings are parallel to the opposed faces 7 and 8 of a filmstrip in the path defined by the filmstrip guides, and are for admitting the film feeding rollers 34 and 35 to that portion of such path which extends between the filmstrip ingress and egress opening 16 and the filmstrip retaining finger 17. The film feeding rollers enter the access openings in the cartridge to frictionally contact respective ones of the opposed filmstrip faces and sandwich the filmstrip therebetween for driving of the latter.

The filmstrip retaining finger 17 (FIG. 3A) is located along the path defined by the filmstrip guides 19 and 19', and extends at an angle with respect to the opposed faces 7 and 8 of a filmstrip F in such path so as to maintain the free filmstrip end 30 in the filmstrip guides and aligned with the filmstrip opening 16 when the finger engages the edge of the aperture 6 in the free filmstrip end. Thus, it can be seen that the filmstrip retaining finger and the filmstrip guides prevent the free filmstrip end from curling out of alignment with the filmstrip opening 16. With reference to FIG. 3A, the the barb 18 engages the edge of the aperture 6 to positively, i.e. affirmatively, prevent the free filmstrip end 30 from slipping off the free end of the finger 17 should an inserted film reel R inadvertently rotate and a filmstrip thereon partially spill off such reel as a result of such rotation.

Referring now more particularly to FIG. 5, it can be seen that the cartridge 2 may be inserted in the photographic apparatus A. The abutment edges 21 and 21' (FIG. 2) of the cartridge will contact the roller shaft 31 and thereby prevent full insertion of the cartridge into the photographic apparatus if the cartridge is improperly insertion oriented. The cartridge notches 20 and 20' (FIG. 3) receive the roller shaft 31 and insure that the filmstrip opening 16 is correctly positioned with respect to the film feeding rollers 34 and 35 when the cartridge is properly inserted in the photographic apparatus.

The projections 24 and 24' as viewed in FIGS. 1, 2 and 5 are formed on the respective exterior member surfaces 14 and 14' of the flexible arms 15 and 15'. When the cartridge 2 is inserted in the container 3, the projections 24 and 24' will contact and be depressed by the container's interior element surfaces 28 and 28' respectively so as to inwardly bend the flexible arms 15 and 15' until the arms frictionally contact the flanges 11 and 12 of an inserted filmstrip reel and thereby restrain such reel against any inadvertent movement that would spill a filmstrip off the inserted reel.

The relieved areas formed by the exterior element surfaces 27 and 27' of the container 3 and the raised container portion 32 are suitable for the receipt of filmstrip identification labels (not shown). In addition, such relieved areas also permit any outward flexing of the container's opposed wall elements 25 and 26 that may occur, i.e. when the projections 24 and 24' contact the container's interior element surfaces 28 and 28' on insertion of the cartridge 2 into the container 3 (FIG. 1), without adding to the thickness of the cassette 1. Thus, it can be appreciated that the relieved areas will allow a cassette to be stacked in a pile of cassettes without imposing excessive pressure on a reeled filmstrip which is restrained against movement within the cartridge interior 4.

In one mode of operation utilizing the present invention, a cartridge 2 supporting a reeled filmstrip within its interior 4 is withdrawn from a container 3 and is inserted into the supply area of the photographic apparatus A for unwinding and utilization of such filmstrip (FIG. 5). Another cartridge that is structurally identical to the cartridge 2, but supporting an empty film reel within its interior 4, is inserted into the photographic apparatus take-up area (not shown) for winding of the utilized filmstrip onto such empty film reel. Thus, the pair of cartridges respectively function as supply and take-up cartridges. As described above, the cartridge openings 33 and 33' (FIGS. 2, 3 and 5) are designed to admit the film feeding rollers 34 and 35 to the filmstrip path defined by the filmstrip guides 19 and 19' in order to drivingly engage a filmstrip on such filmstrip path. The opposed wall members 9 and 10 of each cartridge 2 are cut away, as shown in FIG. 2, so that supply and take-up spindles (not shown) of the photographic apparatus may be inserted in the hubs of the film reels respectively supported within the aforementioned supply and take-up cartridges. When the cartridge supporting a reeled filmstrip is inserted in the photographic apparatus supply area, a device (not shown) in the photographic apparatus and as disclosed in previously cited copending U.S. application Ser. No. 35,802, automatically disengages the edge of the aperture 6 in the free, i.e. leading, filmstrip end 30 from the filmstrip retaining barb 18, while leaving the aperture edge engaged on the filmstrip retaining finger 17. Because the free end of the finger extends toward the filmstrip ingress and egress opening 16, the engaged filmstrip will slide off the finger's free end when the film feeding rollers drivingly engage the free filmstrip end and draw the filmstrip off the film reel.

As the filmstrip is unwound from the supply cartridge an automatic threading device (not shown) will temporarily enter the take-up cartridge through its three open sides and thread the free, i.e. leading, end of the filmstrip 30 onto the hub of the empty film reel retained in the take-up cartridge.

After the filmstrip has been run through the photographic apparatus and is wound onto the hub of the film reel in the take-up cartridge, the aperture in the new free, i.e. leading, filmstrip end (formerly the trailing end) will be engaged on the filmstrip retaining finger and barb of the take-up cartridge by a device (not shown) in the photographic apparatus and as disclosed in the aforementioned copending U.S. application Ser. No. 35,802. Thereafter, the take-up cartridge supporting the newly reeled filmstrip within its interior 4 may be removed from the photographic apparatus and inserted into a container 3.

In applications wherein a reeled filmstrip is exposed but undeveloped, the cartridge supporting such filmstrip when received in the container interior 5 will provide protection from any light source. Furthermore, as described above, the projections on the cartridge's flexible arms 15 and 15' cooperate with the container's interior element surfaces 28 and 28' to restrain the supported filmstrip reel against inadvertent movement during handling of the cassette.

The invention has been described in detail with particular reference to a preferred embodiment thereof, but it will be understood that variations and modifications can be effected within the spirit and scope of the invention.

I claim:

1. A magazine for a web spool, said magazine comprising:
   cartridge means for movably supporting a web spool; and
   a container having an open interior shaped for removably receiving said cartridge means and a web spool supported thereby;
   said cartridge means and said container including cooperating means for restraining such a supported web spool against movement relative to said cartridge means upon receipt of said cartridge means and such a supported web spool in said container interior.

2. A magazine as recited in claim 1, wherein said cartridge means has an open interior shaped for removably receiving a web spool and includes flexibly movable means for releasably retaining a web spool in said cartridge means interior.

3. A magazine as recited in claim 1, wherein said cooperating means includes web spool restraining means, disposed on said cartridge means for movement into intimate frictional contact with a web spool supported by said cartridge means, and a surface portion of said container interior, disposed to so move said web spool restraining means upon receipt of said cartridge means and such a supported web spool in said container interior.

4. A magazine as recited in claim 3, wherein said container has an exterior surface and includes a relieved area disposed on a portion of said exterior surface which is located opposite said surface portion of said container interior.

5. In a magazine for a web reel of the type provided with at least one flange member, the combination comprising:
   cartridge means having an open interior shaped for removably receiving such a web reel; and
   flexibly movable means disposed on said cartridge means for releasably retaining such a web reel in said cartridge means interior;
   said web reel retaining means, including a lip portion located in said cartridge means interior, and being constructed so that said lip portion normally engages a flange member of a web reel in said cartridge means interior and so that said lip portion is movable to a position disengaged from the last-mentioned flange member.

6. The combination as recited in claim 5, further comprising container means having an interior shaped for removably receiving said cartridge means, said container means and said cartridge means being constructed to form a light-tight magazine upon receipt of said cartridge means in said container means.

7. In a cartridge for containing a coil of strip material of the type provided with a free strip end and with an aperture located in such end, the combination comprising:
   means defining a strip ingress and egress opening in said cartridge;
   means for guiding such strip material along a path extending from within said cartridge to said strip ingress and egress opening; and
   strip retaining means, disposed along said path at a location adjacent said strip ingress and egress opening, for engaging the free strip end via the strip aperture when such strip material is contained in said cartridge and the free strip end is in said path;
   said strip retaining means including barb means for affirmatively maintaining engagement of the free strip end by said strip retaining means.

8. The combination as recited in claim 7, wherein said strip retaining means includes a finger member having a first end portion fixed to said cartridge and a second, free end portion extending in a direction toward said strip ingress and egress opening.

9. In a cartridge for containing a coil of strip material of the type adapted to cooperate with a strip feeding mechanism and provided with a free strip end and with an aperture located in such end, the combination comprising:
   means defining a strip ingress and egress opening in said cartridge;
   means for guiding such strip material along a path extending from within said cartridge to said strip ingress and egress opening;
   strip retaining means, disposed along said path at a location adjacent said strip ingress and egress opening, for engaging the free strip end via the strip aperture when such strip material is contained in said cartridge and the free strip end is in said path;
   said strip retaining means, including a finger member having a free end portion extending in a direction toward said strip ingress and egress opening, and being constructed so that said free end portion is removably receivable in the strip aperture; and
   means defining at least one cartridge access opening for admitting a strip feeding mechanism to a section of said path extending between said strip ingress and egress opening and said free end portion of said finger member, whereby a strip feeding mechanism so admitted can disengage such strip material from the finger member and feed the strip material out of said cartridge.

10. A cassette for a film reel having spaced opposed flange members and adapted to receive a filmstrip of the type provided with a free strip end and with an aperture located in such end, said cassette comprising:
    cartridge means having an open interior shaped for removably supporting such a film reel and having a pair of opposed members extending substantially parallel to the flange members of a film reel so supported, each of said opposed members having an exterior member surface and an interior member surface, a portion of at least one of said opposed members being flexibly movable into intimate frictional contact with a flange member of such a supported film reel; and
    container means having an interior shaped for removably receiving said cartridge means and constructed to form with said cartridge means a light-tight magazine upon receipt of said cartridge means in said container means interior;

said container means including a pair of opposed elements extending substantially parallel to the flange members of such a supported film reel when said cartridge means and the last-mentioned reel are received in said container means interior, each of said opposed elements having an exterior element surface and an interior element surface;

said cartridge means including: means, disposed on said exterior member surface of said flexibly movable portion, for cooperating with said interior element surface of one of said opposed elements of said container means to effect movement of said flexibly movable portion into intimate frictional contact with a flange member of such a supported film reel when said cartridge means and the last-mentioned reel are received in said container means interior; means defining a filmstrip ingress and egress opening; filmstrip guide means for guiding such a filmstrip along a path extending from within said cartridge means interior to said filmstrip ingress and egress opening; filmstrip retaining means, disposed along said path at a location adjacent said filmstrip ingress and egress opening, for engaging an edge of the aperture in the free end of a filmstrip received on such a supported film reel barb means for affirmatively maintaining engagement of the free filmstrip end by said filmstrip retaining means; means, disposed adjacent said filmstrip ingress and egress opening, for providing access to a section of said path extending between said filmstrip ingress and egress opening and said filmstrip retaining means; and film reel retaining means, disposed on said flexible portion, for releasably retaining such a supported film reel in said cartridge means interior.

11. A cassette as recited in claim 10, wherein said cartridge means is adapted to be inserted into photographic apparatus of the type provided with film feeding rollers and with a roller shaft, and wherein said cassette further includes:

abutment means disposed on said opposed members for preventing insertion of said cartridge means into such photographic apparatus should said cartridge means be improperly insertion oriented; and notch means disposed on said opposed members for receiving the roller shaft to position said cartridge means with respect to the film feeding rollers when said cartridge means is inserted into such photographic apparatus.

* * * * *